000 # United States Patent Office 2,695,226
Patented Nov. 23, 1954

2,695,226

INDIUM PURIFICATION USING BARIUM SULFATE, STRONTIUM SULFATE, OR BOTH

Yurii E. Lebedeff, Metuchen, N. J., assignor to American Smelting and Refining Company, New York, N. Y., a corporation of New Jersey No Drawing. Application January 31, 1952,
Serial No. 269,334

2 Claims. (Cl. 75—108)

This invention relates to a process for separating from indium, metals which are difficultly separable therefrom by pyrometallurgical processes. More particularly, it relates to a process in which such metals are removed from an impure indium solution by forming therein a precipitate of barium or strontium sulphate or mixtures thereof.

Heretofore, pyrometallurgical processes (so-called kettle processes) have been used to separate, from indium and indium-bearing materials, metals and metal values that are undesirably present therein. Such processes are effective for the separation of "kettle-removable" metals which include all of the metals above indium in the electromotive series of metals, and some of the metals below indium in this series.

Pyrometallurgical processes, however, are generally ineffective for the removal of other of the metals below indium in the electromotive series. Such metals are lead, tin, bismuth and silver and are referred to herein as metals difficultly removable from indium by pyrometallurgical processes or difficultly removable or separable metals. Silver and bismuth can be removed from indium only with great difficulty by such processes and these processes are ineffective, for all practical purposes, for the removal of lead and tin. Consequently, indium, free of or having a desirably low content of the difficultly removable metals, could not be produced commercially, heretofore, from indium-bearing materials containing these metals.

The principal object and advantage of the invention is to provide a simple, practical and economical process for the separation from indium of metals removable therefrom with difficulty by pyrometallurgical processes. Another object is to provide a process for separating such metals, especially lead or tin or both, from indium when they are present therein in small quantities. Other objects and advantages will be apparent to those skilled in the art from the following detailed description of the invention.

Broadly, the invention comprehends a process for purifying an indium solution containing a difficultly separable metal or metals by forming in the solution a precipitate of barium sulphate or strontium sulphate or both and separating the precipitate containing the lead or tin from the solution. Thereafter, the indium remaining in the solution may be recovered in any suitable manner.

The process may be conducted at sub, super or atmospheric pressure and at temperatures between the freezing point up to and including the boiling point of the solution. Preferably, it is conducted at atmospheric pressure and at temperatures in the range of about 20–80° C. It has been found that tin is most efficiently removed at higher temperatures and temperatures in the range of about 40–80° C. especially 55–65° C. are preferred for tin removal. The effect of temperatures on lead removal is not as great as in the case with tin. Generally, the removal of lead is somewhat favored by lower temperatures; and, for this purpose temperatures in the range of about 20–40° C. are preferred. Silver and bismuth removal are substantially unaffected by temperature. Accordingly, for most efficient removal of lead and tin when both are present, it is desirable and advantageous to use the preferred tin removal temperatures although the process may be conducted in a plurality of steps using the preferred tin removal temperatures in one step and the preferred lead removal temperatures in another step.

Although indium solutions containing any amount of difficultly separable metal may be purified by the process, it is particularly effective for indium solutions containing a minor amount of these metals, such as solutions containing less than 2 grams per liter, and especially solutions containing less than 1 gram per liter and preferably less than .5 grams per liter in the aggregate of these metals. The amount of barium sulphate or strontium sulphate or both that is used, will depend upon the amount of the difficultly separable metals present in the solution. In general, best results are obtained when a voluminous precipitate is formed which amounts to about 20 to 250 times, and preferably 50 to 100 times, the aggregate weight of the difficultly removable metal in the solution. For most solutions that are encountered, good results are obtained by forming the equivalent of up to 40 grams per liter or more of the precipitate in the solution and preferably about 10 to 30 grams per liter.

Preferably, the indium solution is an aqueous acid solution having an acidity of about 1–10 grams of acid per liter. Any suitable acid such as hydrochloric acid, acetic acid and the like may be used to establish the solution and the excess acidity therein. The precipitate may be formed in the solution by adding thereto a soluble or a relatively soluble salt of barium or strontium or both, such as the chloride or carbonate, to form the corresponding insoluble sulphate from the sulphate values present or added to the solution. Generally, however, the impure indium solution is established by the use of sulphuric acid which contributes to the solution sufficient sulphate values to precipitate the barium or strontium, as sulphates, which metals are preferably introduced into the solution in the form of a concentrated solution.

The indium remaining in the solution after the separation of the precipitate containing the difficultly removable metal may be recovered in any suitable manner such as, for example, by electrolyzing the solution to deposit the indium therein on a cathode. Preferably, however, the indium is recovered from the solution by galvanic precipitation. In accordance with the preferred process, a galvanic precipitant higher than indium, and preferably higher than chromium, in the electromotive series of metals is added to the solution in sufficient quantities to precipitate the indium therein as metallic indium. The thus precipitated indium is then separated and recovered from the solution. Thereafter, the recovered indium may be kettle processed, if desired, to separate kettle-removable metals that may be present, including the galvanic precipitant.

Aluminum, zinc, magnesium, and manganese are the preferred metals for galvanically precipitating the indium from the purified solution. Of these metals, aluminum is the most preferred, both because the cost per pound of precipitated metal is lowest when it is used and also because low cost commercial aluminum is available which is free of the difficultly separable metals.

When aluminum is used as the galvanic precipitant, it is desirable that the solution have, or be adjusted to have, a chloride content of about 30–90 grams per liter of chlorine as chloride. Although greater or lesser amounts or no chloride need be present when aluminum is used, the presence of the amounts indicated insures the formation of a coalescent metallic precipitate which is easily separated from the solution.

The galvanic precipitant used to recover the indium from the purified solution should be a metal that is free of the difficultly removable metal or metals as any such metal introduced into the solution with the precipitant will contaminate the recovered indium. For purposes of recovering the indium, the galvanic metal may be considered to be free of difficultly removable metal or metals when its content of such metal or metals is insufficient to contaminate the recovered indium beyond acceptable limits. For example, if indium of 99.9% purity is to be produced, aluminum containing not in excess of about 0.15% by weight in the aggregate of difficultly separable metals may be used. Correspondingly, zinc containing not in excess of 0.05% and magnesium containing not in excess of 0.10% in the aggregate of the difficultly removable metals may also be used.

The invention is further illustrated in the following specific examples. It should be understood, however, that the examples are given for purposes of illustration and that the invention in its broadest aspects is not limited thereto.

EXAMPLE 1

1000 cc. of an indium solution having the following analyses was prepared:

In=50 gms./l. as sulphate
Cl⁻=90 gms./l. as sodium chloride
$H_2SO_4$=6 gms./l.
Pb=0.045 gms./l.
Sn=0.080 gms./l.

The solution was heated to 45–50° C., after which 14 grams of aluminum powder substantially free of difficultly separable metals was added and the mixture was stirred for one hour to coalesce the spongy precipitate that was formed. The mixture was then filtered and the filtrate was found to contain 0.1 gram per liter of indium. The wet metallic sponge-precipitate separated by the filtration was fused with a caustic solution containing 35 grams of sodium hydroxide and 35 cc. water. The caustic residue was then treated at room temperature with additional water to remove the aluminum and caustic content of the product. The supernatant solution was separated by decantation and was found to contain 1 gram of indium. 49 grams of indium metal remained after the caustic treatment and had an analyses as follows:

In=98%
Pb=.1%
Sn=0.16%

It will be noted that essentially all of the lead and tin in the original solution is contained in the metallic indium sponge product.

EXAMPLE 2

To 1000 cc. of indium solution having the analyses set forth in Example 1 were added 22 grams of barium carbonate. The mixture was stirred for one-half hour and filtered. The solution was at room temperature, i. e. about 30° C. during the addition and the stirring. The filtrate was heated to 45–50° C. and to it was added 13 grams of aluminum powder substantially free of lead and tin. The mixture was stirred for one hour to coalesce the spongy precipitate that was formed after which the solution was filtered. The wet metallic sponge precipitate was treated in the manner described in Example 1. 49 grams of metallic indium sponge was recovered and had the following analyses:

In=98%
Pb=.002%
Sn=.04%

98% of the lead and 76% of the tin content of the original impure indium solution were removed with the barium sulphate precipitate and the final indium metal product was considerably lower in lead and tin than is Example 1.

In each of the following examples, the results of which are given in Table I, 1000 cc. of indium solution was prepared having dissolved therein 50 grams of indium, 6 grams of excess acid, and the additional metals indicated in each case in the table. In Examples 3, 4, 7, 8 and 11, the indium and the additional metals were present as sulphate, the excess acid was $H_2SO_4$ and 67 grams of sodium chloride were also added. Examples 6 and 10 were the same except that no sodium chloride was added and sufficient additional acid was added to maintain a final excess acidity of 6 grams per liter.

The amounts of soluble barium or strontium salts indicated in the table were then added to each solution. Each solution was stirred for the length of time set forth in the table and then was filtered. The stirring time and temperature of the solution during the addition and the stirring were as indicated in each case. The temperature of each of the filtrates was then adjusted to 45–50° C. and 11 grams of aluminum powder substantially free of difficultly separable metal was added to each of the filtrates. After the aluminum powder was stirred into each solution, it was filtered to recover the precipitated indium. Each of the indium precipitates thus formed was treated with caustic solution as described in Example 1 to recover the indium product. The removal of the difficultly separable metal or metals during the first precipitation in each case was as indicated in the table in the column entitled "per cent removal."

*Table I*

| Example | Composition or Soln. in Gr./Liter | | | | Precipitation | | | Percent Removal | | | |
|---|---|---|---|---|---|---|---|---|---|---|---|
| | Pb | Sn | Bi | Ag | Reagent, Grams | Temp., °C. | Stirring Time | Pb | Sn | Bi | Ag |
| 3 | 0.045 | 0.08 | | | 12BaCl₂.2H₂O | 60 | ½ | 91.75 | 93.7 | | |
| 4 | 0.045 | 0.08 | | | 12BaCl₂.2H₂O | 30 | ½ | 98.9 | 61.0 | | |
| 5 | | | 0.1 | | 12BaCl₂.2H₂O | 60 | ½ | | | 92.0 | |
| 6 | | | | 0.1 | 10BaCo₃ | 60 | ½ | | | | 25.0 |
| 7 | 0.045 | 0.08 | | | 18.5SrCl₂.6H₂O | 60 | ½ | 99.2 | 99.5 | | |
| 8 | 0.045 | 0.08 | | | 18.5SrCl₂.6H₂O | 30 | ½ | 92.0 | 15.0 | | |
| 9 | | | 0.1 | | 18.5SrCl₂.6H₂O | 60 | ½ | | | 91.0 | |
| 10 | | | | 0.1 | 10SrCo₃ | 60 | ½ | | | | 26.5 |
| 11 | 0.045 | 0.08 | | | 18.5SrCl₂.6H₂O | 60 | 5 | 99.2 | 98.0 | | |

The impure indium solution upon which the process of the invention is practiced may be prepared in any suitable manner from any suitable starting material. For example, an aqueous indium-bearing solution may be obtained by hydrometallurgical treatment of an indium-bearing zinc calcine or zinc oxide. It may also be obtained by acid leaching the slag resulting from the pyrometallurgical refining of a lead alloy containing indium. The method of the present invention, however, is equally applicable to the treatment of other indium-bearing solutions otherwise obtained.

As stated previously, the invention may be practiced with any indium-bearing solution containing any amount of difficultly separable metal dissolved therein. In general, it is desirable that the total concentration of these impurities be less than the concentration of the indium. Generally, a solution is preferred which contains 10 to 100 grams per liter of dissolved indium and a total concentration in the aggregate of difficultly separable metal not in excess of about 2 grams per liter. An indium product containing in the aggregate less than 0.1% of difficultly removable metal and as little as less than .01% of each of these metals may be readily recovered from the process.

The present invention may be embodied in other specific forms without departing from the spirit or essential attributes thereof and it is therefore desired that the present embodiments be considered in all respects as illustrative and not restrictive, reference being had to the appended claims rather than to the foregoing description to indicate the scope of the invention.

What is claimed is:

1. A process for removing more than 90% of the tin present in a mineral acid solution of indium containing less than about 0.5 gram per liter of dissolved tin as an impurity which consists of forming in the solution about 10–30 grams per liter of a precipitate of a material selected from the group consisting of barium sulfate, strontium sulfate, and mixtures thereof while agitating said solution and maintaining it at a temperature in the range of about 40–80° C., and separating the precipitate from the solution thereby removing more than 90% of said dissolved tin from the solution.

2. A process according to claim 1 in which said solution is maintained at about 60° C. during said precipitation and agitation.

(References on following page)

References Cited in the file of this patent

UNITED STATES PATENTS

| Number | Name | Date |
|---|---|---|
| 2,192,154 | Schuermann et al. | Feb. 27, 1940 |
| 2,271,970 | Doran et al. | Feb. 3, 1942 |

OTHER REFERENCES

Kolthoff et al.: "Textbook of Quantative Inorganic Analysis," MacMillan Co., 2nd ed. (1947); page 111.

Sandell, E. B.: "Colorimetric Determination of Traces of Metals," Interscience Publishers Ltd., London, 2nd ed. (1950), pages 20–26.

Handbook of Chemistry and Physics, Chemical Rubber Publishing Co., 28th ed. (1944), page 1380.